United States Patent [19]

Sleger

[11] Patent Number: 5,029,027
[45] Date of Patent: Jul. 2, 1991

[54] THERMALLY PREDICTABLE DISK DRIVE MECHANISM

[75] Inventor: Roger R. Sleger, Meridian, Id.

[73] Assignee: Hewlett-Packard Company, Palo Alto, Calif.

[21] Appl. No.: 434,661

[22] Filed: Nov. 13, 1989

[51] Int. Cl.[5] .................. G11B 33/14; G11B 5/12
[52] U.S. Cl. ........................... 360/97.30; 360/97.01
[58] Field of Search ............... 360/97.01, 97.02, 97.03

[56] References Cited

U.S. PATENT DOCUMENTS

| 4,613,921 | 9/1986 | Holmes | 360/99.05 |
| 4,825,316 | 4/1989 | Kishi et al. | 360/97.02 |

FOREIGN PATENT DOCUMENTS 0223093  11/1985  Japan ..................... 360/97.02

OTHER PUBLICATIONS

IBM Disclosure Bulletin, vol. 30, No. 10, Mar. 88, "Thermally Compensated Head Disk Assembly Frame For Rotary . . . ".

Primary Examiner—A. J. Heinz
Assistant Examiner—Jefferson Evans
Attorney, Agent, or Firm—E. F. Oberheim

[57] ABSTRACT

A disk drive having a base and a cover, enclosing the memory disks and the magnetic head actuator. The spindle journaling the memory disks and the support for the actuator are secured to the base and to the cover and relatively position the base and the cover with respective peripheral extremities in closely spaced, but not touching relationship, to provide a gap therebetween. A pressure sensitive adhesive tape of a material having a high shear strength is applied to the base and the cover bridging the gap without applying stresses to the cover or the base through the tape and providing a seal for the disk drive between the cover and the base. The materials of the base, the cover, the spindle and the support, have thermal coefficients of expansion which are at least substantially the same. Preferably the materials are the same. Steel is a preferred material. The design also provides rigidity between the ends of the rotary mounting of the memory disks and the support for the magnetic head actuator while providing flexibility in the connections between the base and cover, and thereby eliminating thermally induced slip at these connections. Slip between structural parts of a disk drive can prevent reliable writing and reading of data.

9 Claims, 1 Drawing Sheet

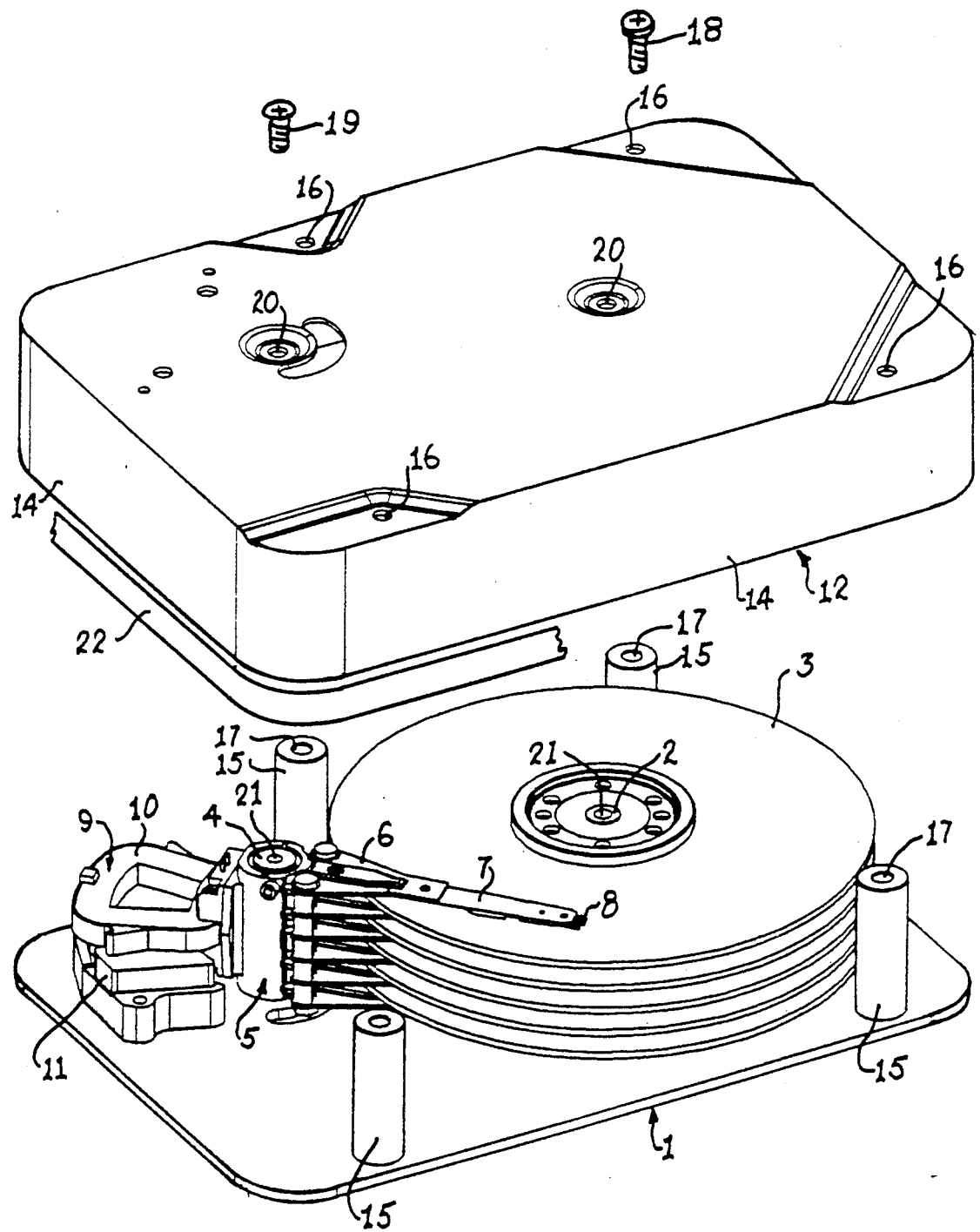

THERMALLY PREDICTABLE DISK DRIVE MECHANISM

TECHNICAL FIELD

This invention relates generally to disk drives in which provision is made to improve dimensional stability and the predictability of dimensional changes in the presence of thermal changes.

BACKGROUND OF THE INVENTION

Disk drives are employed as large volume data storage devices in applications with respect to computers and data processors. The data is stored on the surfaces of the memory disks in such drives. The memory disks are journalled for rotation on a disk spindle mounted on a supporting structure such as a base or a main frame of the disk drive. Data heads are used to write narrow tracks of data on the surface of data disks, that can be repeatedly read back at a later time by positioning the data heads, in what is called a track following mode, over these narrow data tracks as the disks are rotated. Data tracks on the disk surfaces are currently on the order of about 10 microns wide. To reliably read data from such a narrow pre-recorded data track, the data head must be positioned over the data track to within about a half micron of the center of the track.

A data head is flexibly secured to the end of each arm of an arm stack comprising part of a movable positioner or actuator that is mounted on the same supporting structure as the spindle which rotatably mounts the memory disks. This may be a rotary or a linear actuator. In most high performance disk drives, one head, called a dedicated head, and an adjacent disk surface, dedicated to servo code, are used to provide input to a head positioning servo for track seeking and track following purposes. The positioning servo, using signals from the dedicated head, positions the dedicated head accurately over a selected servo code track on the surface of the dedicated memory disk in a track following mode of operation, when a data track is being written in a corresponding track on a data disk surface. After data is written in the data tracks on the data disk surfaces, any mechanical displacements, that is, changes in relative position, that develop between the servo head and the data heads, results in data head offset from track center and reduces the integrity of the data which is being read. If the positioning errors are unpredictable in the presence of temperature variations for example, then there is little that can be done towards preserving the integrity of the data which is being read. If, on the other hand, positioning errors develop that are predictable, then it is possible to characterize and integrate correctional feedback information to the servo system, as will be explained at a later point.

Typically, disk drive supporting structures are made as rigid and stiff as possible for the purpose of minimizing head offset from the track center of a pre-written data track on a disk in a subsequent read operation. The particular material used for each of the various parts within the drive is chosen for optimum functionality and cost. But because of this, some significant drive performance problems often arise.

First, when stiff, rigid parts are fastened to each other, they are no longer free to change dimension independently of one another. In the fabrication of a disk drive, parts are assembled at very nearly the same temperature. But when the drive is operated, heat is developed and temperature gradients occur. These temperature gradients cause the different parts of the drive to change in dimension, which may create enough stress at the fastened locations to force minute unpredictable slip in the relative position of the parts.

Second, when structural parts of the disk drive are made from different materials, the thermal coefficients of expansion also tend to be different. When these rigid parts are fastened together, as in a disk drive supporting structure and exposed to temperature extremes, as often encountered in shipment, the stresses that develop at the connection areas can easily cause the connection to permanently slip. Once again, this slip is unpredictable as to exactly when and how much will occur.

In practice, disk drives have been thermally cycled prior to writing data tracks on the disk surfaces in an effort to somewhat relieve connection area stresses and thereby minimize thermally induced positioning errors. While this process improves the probability of long term positioning accuracy of the drives, it does not solve the problem and some unacceptable percentage of the drives that are thermally cycled will still be prone to positioning problems. The time and the cost of thermally cycling production quantities of disk drives is also undesirable.

DISCLOSURE OF THE INVENTION

This invention is directed to an improved disk drive which:

will exhibit predictable dimensional shifts in a changing thermal environment, at least within a range which can be handled by the servo or which will produce predictable data which can be compensated in positioning the servo head, will minimize the development of permanent dimensional changes that result from typical operational or storage thermal environments, and will not require thermal cycling after assembly and prior to formatting of the data tracks.

These improvements and advantages are achieved by making all the structural parts of the disk drive from materials having low valued, nominally the same, thermal expansion coefficients. In addition, a degree of structural flexibility is provided in the structural parts of the disk drive, while maintaining rigidity and stiffness where needed.

The first part of this invention is to make the design of the structural components of a disk drive of materials having substantially the same thermal expansion coefficients. The smaller the expansion rate the better. In one application, steel is used since it has a low expansion coefficient among the common, low cost materials. The second part of this invention is to design flexibility into the disk drive structure such that part dimensional changes, as occur in the normal use of a product, do not impose a large stress on the areas that connect parts to one another. The stresses at the connection areas must be kept low enough that even under the worst thermal exposures, joint slip or creep does not occur since this results in unpredictable offsets.

A structure incorporating flexibility to obviate slippage at joints and having low, matched thermal coefficients of expansion for achieving predictability in a disk drive mechanism, is the subject of this invention.

BRIEF DESCRIPTION OF THE DRAWING

The single FIGURE is an isometric illustration of a disk drive embodying the principles of this invention.

BEST MODE FOR CARRYING OUT THE INVENTION

Referring to the single FIGURE of the drawing, the disk drive comprises a base or main frame 1 on which a disk spindle 2 is mounted. A disk stack assembly 3, comprising individual disks 3a, is journalled by bearing 2a on the disk spindle 2. This disk stack assembly is rotated at constant speed by a drive motor which is an integral part of the disk spindle. The invention is applicable to both linear or rotary actuator types of disk drives in which a stationary support movably mounts the actuator. The disk drive which is illustrated is of the rotary actuator type. To this end, the stationary support is an actuator spindle 4 which is secured to the main frame 1 adjacent an edge of the disk stack assembly 3. An actuator bearing housing 5 is journalled on the actuator spindle 4 and mounts a plurality of arms 6 which in turn mount flexures 7 which flexibly mount magnetic heads 8 at their extremities. As seen, the arms 6 project between the individual disks 3a of the disk stack assembly for the purpose of positioning magnetic heads 8 adjacent each surface of the individual disks. These magnetic heads 8 are disposed one above the other in the arm stack illustrated in precise alignment both longitudinally of the arm assemblies and laterally with respect to one another, in which physical alignment they can be positioned over corresponding tracks on the respective disks. One magnetic head, usually the magnetic head on the bottom arm on the bottom side of the bottom disk, is the dedicated head and the dedicated disk surface then is the bottom surface of the bottom disk on which the servo code defining the individual tracks is recorded.

An electromagnetic driver, generally designated 9, is employed to drive the rotary actuator. This electromagnetic driver 9 comprises a coil 10 secured to the bearing housing 5 and a permanent magnet structure comprising permanent magnets 11, one which is illustrated, is disposed below the coil 10 and another, not illustrated, is positioned above the coil 10. This coil is adapted to be energized with direct current of reversible polarity to interact with the magnetic field of the permanent magnets, to produce an electromagnetically generated force which moves the coil in one direction or the reverse about the axis of the actuator spindle 4, to move the magnetic heads 8 in an arc about the actuator spindle 4, radially over the disk surfaces. In this manner, track seeking is accomplished and track following achieved whenever a selected track is found.

A disk drive enclosure of the type described in a copending application of Roger R. Sleger, Ser. No. 07/434,653, filed on the same date as this application, entitled "Disk Drive Enclosure For Minimizing Stresses and A Vibration Damping Seal Therefor", assigned to the assigned of this invention, is employed herein and is described herein to the extent believed to be necessary in understanding this invention. To this end a cover 12, having a top plate 13 and depending sides and ends 14, encloses the disk drive assembly. In the drawing, this cover 12 is elevated above the disk drive so that the disk drive components may be visible. In assembled position, the inner face of the top plate 13 of the cover 12 seats upon the upper ends of posts 15 which are secured to the base or main frame 1 and which project upwardly therefrom. Holes 16 through the upper plate 13 of the cover 12 are aligned with threaded holes 17 in the upper ends of the posts 15. The cover is secured to the upper ends of these posts by means of screws 18, only one of which is shown, which extend through the top plate 13 and individually thread into the adjacent threaded hole 17 in the upper end of each of the posts 15. Additionally, screws 19, only one of which is shown, individually extend through respective holes 20 in the top plate 13 and thread into a threaded hole 21 in the upper end of each of the disk spindle 2 and the rotary actuator spindle 4. By securing the upper ends of the disk spindle 2 and the actuator spindle 4 in the top plate 13 of the cover 12, the upper ends of these spindles are stabilized against the cover 12. With the spindle base secured to the main frame, if the upper ends were left free, spindle tilt could take place which would adversely affect the integrity of data reading.

The lengths of the posts 15 and the spindles 2 and 4 are dimensioned with respect to the inner face of the plate 13 so that all confronting face portions thereat make contact with the cover, without the need for deformation, when the cover 12 is positioned over the disk drive assembly. In this position, the lower peripheral edge of the depending sides and ends 14 of the cover plate does not touch the peripheral upper face portion of the base or the main frame 1. When the screws 18 and 19 are installed, the assembly is secured and in particular the spindles 2 and 4 are secured at their ends to the main frame and to the cover.

It is essential that these disk drives be protected against the ingress of contaminants, particularly dust. A final seal between the main frame 1 and the cover 12 is achieved by means of a tape 22, which is only fragmentarily shown, having a surface coated with a pressure sensitive adhesive, but which provides a peripheral seal at the joint between the cover 12 and the main frame 1. In addition to inhibiting the ingress of contaminants at the joint between the cover 12 and the main frame 1, the tape 22, having a relatively high shear strength, provides resistance to relative translational movement between the adjacent sections of the cover 12 and the main frame 1.

Typically, the seal between the main frame and cover of a disk drive is an elastic gasket that is compressed in a gap between the main frame and cover. Over a period of time, and especially elevated temperature, the pressure within the gasket material reduces, also reducing the force that it exerts upon the main frame and cover. These force reductions typically cause minute dimensional changes and distortions to the disk drive structural members and significant data head- to-track positioning errors. The tape seal solves this problem because it does not impose an initial stress on the main frame or cover, and because of the viscous property of the pressure sensitive adhesive, it also does not impose stress changes over the operating temperature range of the disk drive. The tape seal, therefore, is a simple, low cost sealing solution that does not cause dimensional distortions within the disk drive over time and temperature.

This disk drive design provides stability of the ends of the disk spindle 2 and the actuator spindle 4 as required for stable positioning and servo system operation. By connecting the main frame to the cover through the disk spindle 2, actuator spindle 4, and posts 15, a unique degree of flexibility has been introduced into the structure which prevents thermally driven dimensional differences between the main frame and cover from generating enough stress at the connection areas (the cover to post joints) to cause unpredictable slip at these areas. Even with this construction however, relative movement may occur between the upper ends of these spindles with respect to their lower ends as a result of mismatches of thermal coefficients of expansion between the materials of the main frame 1 and the cover 12. Still further, unacceptable displacements may take place even if the thermal coefficients of expansion between the cover 12 and the main frame 1 are the same, or nearly the same, if these parts are subjected to different temperatures.

Thus in addition to matching the thermal coefficients between the base or main frame 1 and the cover 12, it is also important that these thermal coefficients of expansion be as low as possible so that dimensional changes between the axes of the disk spindle 2 and the actuator spindle 4 be minimized. Steel, for example, is a satisfactory material in this respect since it has a low thermal coefficient of expansion. By providing a structure having the required flexibility and by making the main frame 1, the cover 12, the posts 15, the disk spindle 2 and the actuator spindle 4 of the same material and of a material which has a low thermal coefficient of expansion, predictability of offset in the disk drive is achieved and the primary objects of this invention are accomplished.

Where predictability in dimensional changes resulting in head offset is achieved, provisions may be made in the disk drive dedicated servo positioning system to incorporate offsets that radially position the dedicated servo head off track from it's track center such that, ideally, the resulting data head-to-track position error is reduced to zero. The lower the value of offset that is required the better, since greater initial errors produce greater resulting absolute uncertainties. In any case, the uncertainty of the actual offset must be less than the maximum allowable data head-to-track error which ensures reliable reading and writing data.

The correction process thus described requires delaying reading and writing data until after the required servo head-to-track offset has been achieved. An important assumption is made that, during the time that data is being processed, no unpredictable positioning errors will develop that will render the data unreliable. The incorporated offset is assumed to be acceptable until either a predetermined time interval, or a predetermined change in disk drive temperature, have occurred, after which time the system will require offset updating. If positioning errors develop that are unpredictable, the disk drive may not safely read or write data after incorporating an offset because there is not confidence that the required offset will not change during the data processing period that follows.

Whereas the foregoing descriptions address a fixed offset process, it is also possible to evaluate dynamic offsets, such as eccentricities of data tracks relative to the center of rotation of the spindle that the disks are mounted. If a full track of position information were available on each data disk surface, then a fixed offset, plus an eccentricity correction, could be incorporated into the servo positioning to compensate for these more complex errors. Once again, unless these errors develop in a predictable fashion, it may not be assumed that the applied correction is valid during the data processing period that follows.

The importance of closely matching the thermal coefficients of expansion among the several integrated parts in disk drive structures is also discussed in a copending application of Wayne E. Foote et al , Ser. No. 07/434,749, entitled "Magnetic Head Suspension Assembly In A Disk Drive", and in another co-pending application of Wayne E. Foote, Ser. No. 07/434,662, entitled "A Actuator Structure For A Magnetic Head Suspension Assembly In A Disk Drive". These applications have been filed on the same date as this application and are assigned to the assignee of this invention.

The application of Wayne E. Foote et al Ser. No. 07/434,749 is directed to a head suspension assembly in a rotary actuator such as that illustrated herein, in which the mass of the arms supporting the magnetic heads is minimized for the purpose of minimizing torque requirements in track seeking operations. This application of Wayne E. Foote et al also stresses the importance of using materials having the same or substantially the same thermal coefficients of expansion among the parts of the magnetic head suspension assembly to minimize unwanted and unpredictable physical displacement of parts, which would interfere with reading of the data.

The co-pending application of Wayne E. Foote Ser. No. 07/434,662 is directed to the structure of the actuator bearing housing 5, per se, emphasizing the importance of the use of materials in this bearing housing 5, in association with the arm structures 6 and 7 supporting the magnetic heads, to have the same or substantially the same thermal coefficients of expansion.

The teachings of these applicants with respect to their respective structural organizations in a rotary actuator structure, together with those of the present applicant, which latter teachings are directed to the preservation of dimensional integrity among such major components as the disk stack and the rotary actuator, provides a disk drive in which the integrity of data read from the data disks is maximized.

Further improvements are realized with respect to the preservation of the integrity of data read from the disk, in the provision of disks of materials having both a low thermal coefficient of expansion and a thermal coefficient of expansion which is closely matched to that of the material selected for the main frame, the cover, the spindle motor and so forth. In a magnetic disk drive, steel is not acceptable as a disk material. However, glass disks can meet this requirement. One glass disk which is acceptable for this purpose is obtainable from Corning Glass. The disk is then coated with a thin magnetic recording layer, in which magnetic dibits of servo code and data may be recorded. Magnetically coated glass disks are also commercially available from Japanese sources Hoya, Asaki and Nippon Sheet Glass. These glass disks may be assembled in a stack such as that illustrated herein, using the same structure as used for aluminum disks.

Although a single embodiment of this invention has been illustrated herein and demonstrated in connection with a rotary actuator type of magnetic disk drive, it will be evident that the invention is not limited to such application but may be extended to linear actuator disk drives and to applications such as those involving optical recording and reading techniques.

In disk drives involving a rotary actuator, significant improvements in performance are achieved by securing the actuator and the disk spindles at their opposite ends in the manner illustrated, to achieve spindle stability, and by employing materials having at least the same or substantially the same low thermal coefficients of expansion.

INDUSTRIAL APPLICABILITY

Disk drives embodying the principles of this invention are applicable at least in computer and data processing environments.

I claim:

1. In a disk drive including a base, at least one memory disk, a disk spindle secured at one end on said base, bearing means journaling said memory disk on said disk spindle, at least one magnetic head, a stationary support on said base, a movable actuator on said stationary support for movably supporting said magnetic head adjacent a surface of said memory disk, and a cover; a structure for minimizing thermally induced stresses, comprising:

first means for securing said cover to said base in a position to provide a gap between said cover and said base;

second means for securing said cover to said spindle and to said stationary support;

a tape secured to said base and said cover in a position bridging said gap for sealing said gap without applying stresses to said cover and to said base;

said base, said spindle, said stationary support, said cover, and said first means for securing, being of materials having substantially the same thermal coefficients of expansion.

2. The disk drive according to claim 1, in which:
said materials are the same material.

3. The disk drive according to claim 2, in which:
said material is steel.

4. The disk drive according to claim 1, in which:
said stationary support is an actuator spindle and said movable actuator is a rotary actuator journalled on said actuator spindle.

5. The disk drive according to claim 1, in which:
said first means for securing comprises at least three posts.

6. The disk drive according to claim 1, in which:
said tape has a predetermined shear strength for restraining relative movement between said cover and said base.

7. The disk drive according to claim 6, in which:
said tape comprises a pressure sensitive adhesive coating joining said tape to said cover and said base.

8. A disk drive structure having flexibility to prevent thermally driven dimensional differences between the main frame and the cover form generating sufficient stress to cause unpredictable slip at structural joints, comprising:

a base;

at least one memory disk;

a disk spindle secured at a bottom end thereof to said base and having an upper end above said base;

bearing means journaling said memory disk on said disk spindle;

at least one magnetic head;

a stationary support secured at one end thereof on said base and having an upper end above said base;

a movable actuator on said stationary support, movably supporting said magnetic head adjacent a surface of said memory disk;

a plurality of posts each secured at a bottom end to said base in spaced positions on said base and having an upper ends projecting upwardly therefrom;

a cover having respective face portions seated on the upper end of each of said posts and a lower peripheral edge adjacent said base defining a gap between said base end and said cover;

means securing said cover to the upper end of said disk spindle, to the upper end of said posts and to the upper end of said stationary support, and a tape connecting said cover to said base across said gap with minimal connection stresses to the cover and to the base, for providing a seal between said cover and said base to prevent the ingress of contaminants.

9. The disk drive structure according to claim 8, in which:
said stationary support is an actuator spindle and said movable actuator is a rotary actuator journaled on said actuator spindle.

* * * * *